United States Patent [19]
Kliewer et al.

[11] 3,820,499
[45] June 28, 1974

[54] THERMALLY RESPONSIVE COOKING INDICATOR

[75] Inventors: George G. Kliewer; John H. Roberts; Glen R. Gee, all of Fresno, Calif.

[73] Assignee: Minnesota Mining and Manufacturing Company, St. Paul, Minn.

[22] Filed: Mar. 14, 1973

[21] Appl. No.: 341,024

Related U.S. Application Data

[63] Continuation-in-part of Ser. No. 118,910, Feb. 25, 1971, Pat. No. 3,724,360.

[52] U.S. Cl. ............................. 116/114.5, 73/358
[51] Int. Cl. .............................................. G01k 1/02
[58] Field of Search ............. 73/358, 368.3; 99/342, 99/343, 344; 116/114.5

[56] References Cited
UNITED STATES PATENTS

| | | | |
|---|---|---|---|
| 3,001,401 | 9/1961 | Vernet et al. | 73/358 |
| 3,479,876 | 11/1969 | Kliewer | 73/358 |
| 3,626,897 | 12/1971 | Kliewer | 73/358 X |
| 3,682,130 | 8/1972 | Jeffers | 116/114.5 |
| 3,693,579 | 9/1972 | Kliewer | 116/114.5 |
| 3,724,360 | 4/1973 | Kliewer | 116/114.5 |

*Primary Examiner*—Louis J. Capozi
*Attorney, Agent, or Firm*—Alexander, Stell, Steldt & DeLaHunt

[57] ABSTRACT

A body having a central bore, a plunger in the bore which plunger has a piston-like sealing member that defines a volume within the bore. A heat responsive material within such volume which expands at a predetermined temperature to move the plunger to an extended position and to afford a visual indication that the predetermined temperature has been attained. The wall of the volume defines a concavity that entraps an air bubble which avoids sudden or explosive change of state in the heat responsive material and promotes gradual movement of the plunger. The heat sensitive material can be a liquid mixture of ingredients chosen to boil at the desired temperature or can be two reactants (e.g., an acid and a base) which, at temperatures below the predetermined temperature are maintained separate from one another by a membrane that melts at the predetermined temperature. An annular cap surrounding the body for positioning the body and the heat responsive material with respect to the surface of an article of food in which the body is inserted.

13 Claims, 7 Drawing Figures

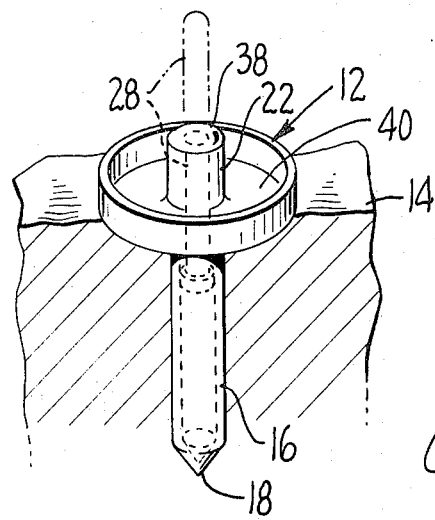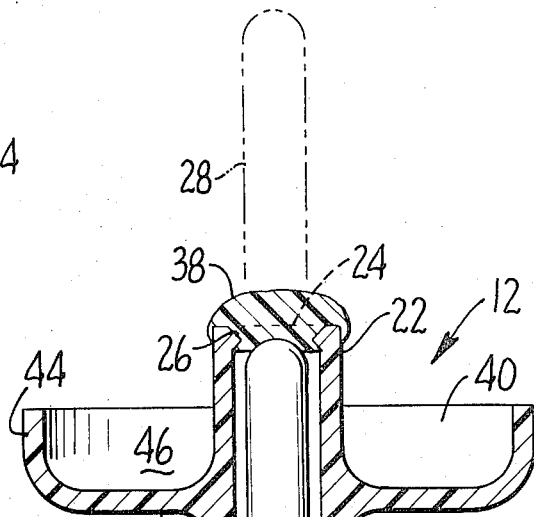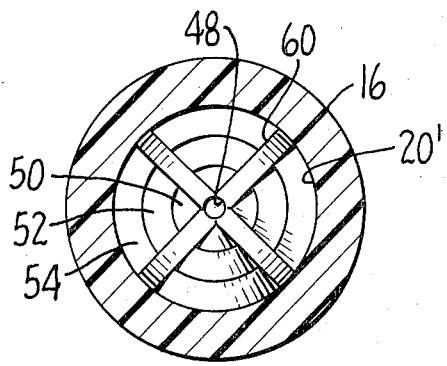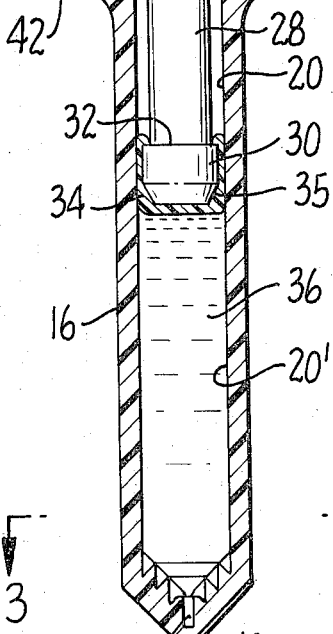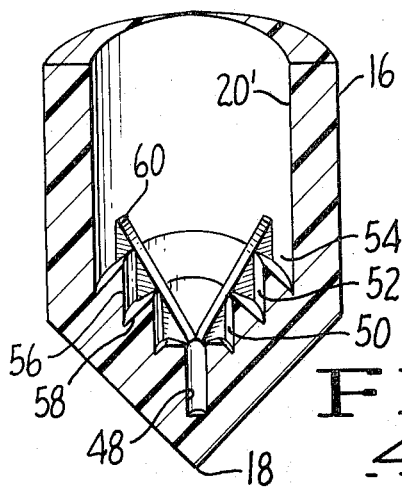

THERMALLY RESPONSIVE COOKING INDICATOR

This application is a continuation-in-part of co-pending U.S. Pat. application Ser. No. 118,910, filed Feb. 25, 1971, now U.S. Pat. No. 3,724,360.

This invention relates to an indicator for use in cooking food articles which affords a visual indication that the food article has reached a predetermined elevated temperature. The invention includes a body, a plunger reciprocable within the body and thermally responsive means that causes the plunger to extend from the housing upon attainment of a predetermined elevated temperature.

There is disclosed in U.S. Pat. No. 3,693,579 a temperature indicator that has a body, a plunger reciprocable within the body, a compression spring for urging the plunger out of the body, and a fusible metal retaining device that retains the plunger within the body against the force of the spring until a predetermined elevated temperature has been attained. In contrast to the structure disclosed in such patent, the present invention achieves extension of the plunger from the body by volumetric expansion of thermally sensitive material within the body, thereby eliminating the need for a spring and consequently simplifying and reducing the cost of production of the thermal indicator. As disclosed in the aforecited co-pending patent application, the material that affords volumetric expansion to move the plunger to an extended position can be selected from numerous compounds or mixtures that change states at temperatures in the range of 53° C. to 100° C. According to the present invention, such material is confined within a closed but expansible volume within the body. The volume is bounded at one end by a piston-like member that is formed on the inner end of the plunger so that upon achievement of the temperature at which the material in the volume changes state, volumetric expansion occurs which moves the plunger outward of the body and affords a visual indication that the food article has reached a temperature suitable for serving.

An object of the present invention is to provide a thermal indicator that includes a plunger which moves outward of the main body in response to attainment of a predetermined elevated temperature without relying on spring force. This object is achieved by providing a body having a longitudinal bore in which a plunger is disposed. The plunger has on the inner end thereof a seal or piston, and there is disposed in the bore inward of the piston a thermally sensitive material that expands on attainment of whatever elevated temperature is desired.

Another object of the present invention is to provide a device of the type referred to above in which the outward movement of the plunger is gradual rather than abrupt so as to avoid escape of the heat sensitive material. This object is achieved by providing within the expansible volume an air space which moderates or makes more gradual the volumetric expansion of the material on attainment of the elevated temperature. In one embodiment of the present invention the air space is within the body; in another embodiment the air space is provided at the inner end of the plunger.

Still another object of the present invention is to provide a device of the type referred to above wherein volumetric expansion is achieved by a chemical reaction, e.g., a neutralization between an acid and a base. This object is achieved by providing within the volume a partition that melts or otherwise breaks on attainment of the predetermined temperature but at temperature below such predetermined temperature forms a partition that divides the volume into two compartments. In one compartment an acid, e.g., vinegar, is disposed, and in the other compartment a base, e.g., baking soda, is disposed. When the partition melts on attainment of the predetermined temperature, the two reactants react to produce volumetric expansion which moves the plunger outward.

Yet another object of the present invention is to provide a device of the type described that will remain in a proper position whether it is used in connection with solid food articles such as meats or liquid food articles such as custards. This object is achieved by providing at the outer end of the main body a cup-like member which defines a shoulder or flange that limits the inward movement of the body into the food article and which buoyantly supports the device when it is placed in a liquid.

The foregoing, together with other objects, features and advantages of the present invention, will be more apparent after referring to the following specification and accompanying drawings in which:

FIG. 1 is a perspective view of one embodiment of the present invention in place in a food article;

FIG. 2 is a cross-sectional elevation view of the device of FIG. 1, in enlarged scale;

FIG. 3 is a sectional view, in enlarged scale, taken along line 3—3 of FIG. 2;

FIG. 4 is an enlarged fragmentary perspective view of the lower end of the device of FIG. 2;

Figure 5:
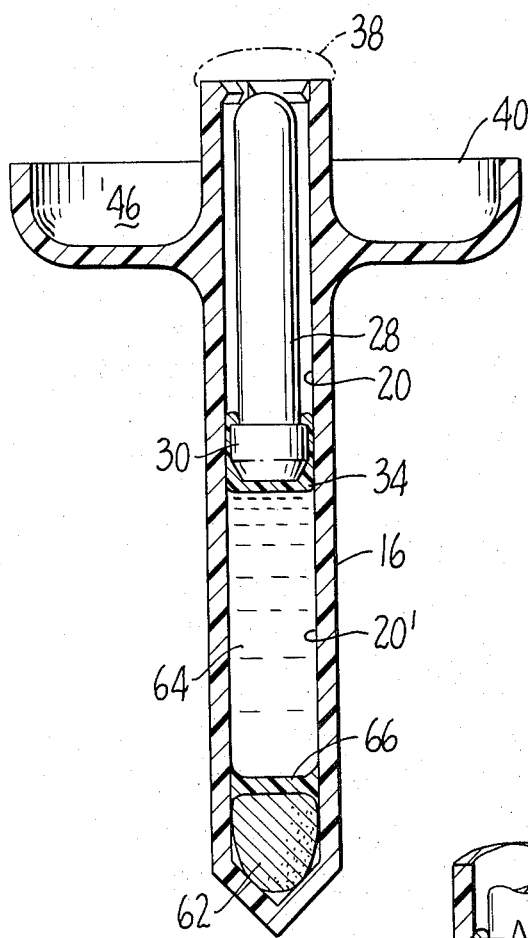
FIG. 5 is a cross-sectional elevation view of another embodiment of the invention shown in the condition before attainment of the elevated temperature.

Referring to FIGS. 1–4 in the drawings, reference numeral 12 indicates a thermal indicator according to the present invention disposed on the surface of a food article 14. The thermal indicator includes a body or shell 16 having at the lower or inner end thereof a tapered portion 18 that facilitates introduction of the thermal indicator into the food article. Body 16 has formed centrally and longitudinally thereof a bore 20 of constant cross-section, typically circular. Bore 20 communicates with the upper end 22 of the body, there being a mouth 24 which is slightly smaller than the diameter of bore 20 by virtue of a lip 26 that circumscribes the mouth. The lip retains a plunger within body 16 against the expansive force of the thermally responsive material within the body.

Within bore 20 there is a plunger 28 which is shown in FIG. 2 in its inwardmost position in solid lines and in its extended position in broken lines. At the inner end of plunger 28 is a piston forming member that includes an enlargement 30, integral with plunger 28 and of larger diameter than plunger 28 so as to define a shoulder 32. Shoulder 32 cooperates to retain in place a seal 34 which is constructed of any suitable sealing material, such a silicone oil or the like. The seal prevents escape of the expansible material within body 16.

Enlargement 30 is tapered at 35 to facilitate entry past lip 26 during assembly of the device.

Plunger 28 is shorter than the longitudinal dimension of bore 20 so that when the plunger is in its innermost position at which its outer end resides at a level closely adjacent mouth 24, a volume 20' is defined between seal 34 and end 18 of the body. Disposed within volume 20' is thermally responsive heat sensitive material 36, the constitution of which, as described in the above cited co-pending application, is determined by the desired elevated temperature of response which, in turn, is selected by the nature of the specific food article. Accordingly, when the predetermined elevated temperature is attained, material 36 expands thereby raising the pressure in volume 20' so as to move plunger 28 outward of body 16 and indicate to the user of the device that the food article has reached the desired elevated temperature. To avoid the intrusion of foreign matter into the device, mouth 24 can be sealed by fusible material 38. Material 38 helps prevent the plunger from being inadvertently displaced and preferably softens prior to the temperature of expansion of the material 36 so as to avoid interference with the outward movement of plunger 28.

It will be noted at FIG. 2 that the diameter of volume 20' and heat sensitive material 36 contained therein is less than the length thereof and less than the amount that plunger 28 travels in going from the innermost to the outermost position. This relation assures adequate extension of plunger 28 with the relatively inexpensive heat sensitive materials disclosed in the above-cited co-pending application. Also contributing to adequate extension of the plunger is the fact that the axial dimension of heat sensitive material is of the same order of magnitude of travel of plunger 28.

In order to position heat sensitive material 36 at the correct depth with respect to the surface of the food article, there is disposed on the exterior surface of body 16, intermediate mouth 24 and the level of piston 30 when the plunger is in its innermost position, a cup 40. Cup 40 is formed by a circular flange 42 which extends radially outward from body 16 and has circumscribing its outer periphery a vertical wall 44 so as to define an annular volume 46 that circumscribes the body. Flange or wall 42 limits the depth of insertion of the device into a food article by abutment against the outer surface of the food article of solid foods. Volume 46 by buoyant displacement establishes the position of the device at the surface of liquid food articles. Moreover, volume 46 captures sealant 38 as well as any of the expansible material 36 that may leak from the interior of volume 20' so as to avoid contamination of the food article thereby.

It has been found desirable that a small air bubble be trapped within the heat sensitive material 36 in volume 20' so as to avoid abrupt or explosive volumetric expansion on attainment of the predetermined elevated temperature and to afford gradual volumetric expansion and, therefore, gradual extension of plunger 12. A nucleation site, defined in the above cited co-pending application, is thus provided. To achieve this in a device capable of being formed by injection molding, the lower axial end of volume 20', as shown in FIGS. 3 and 4, is formed to define depressions from which the heat sensitive material is excluded by the entrapment of air bubbles due to the effect of surface tension when the volume is filled with the heat sensitive material. More particularly, the cavity or volume has at the axial end thereof a centrally located cylindric chamber 48 concentric with which are three generally annular spaces 50, 52 and 54, each succeeding annular space being both radially and axially displaced from cylindric volume 48. To facilitate formation of the structure by conventional injection molding techniques, the annular spaces include a vertical wall 56 and a sloping wall 58 which preferably lies at an angle of about 45° to the central axis of the body. In addition, annular spaces 50, 52 and 54 are divided into four segments by means of uniformly located partition walls 60 which both reinforce the walls of the annular spaces and decrease the volume of each individual space so that the surface tension of heat sensitive material 36 more efficiently permits entrapment of sufficient air bubbles to achieve the desired result.

To assemble the device shown in FIGS. 1–4, a metered amount of heat sensitive material of appropriate constitution is introduced into bore 20 while the body is supported in the upright position of FIG. 2. Because of the construction at the bottom of the bore, air is entrapped in chamber 48 and/or spaces 50, 52 and 54. When the metered amount of heat sensitive material has been introduced, plunger 28 is inserted into bore 20 until the inner surface of seal 34 rests on the surface of the heat responsive material. Sealing material 38 is then placed over the mouth 24 and the unit is ready for its intended use. The assembled unit is then inserted into an article of food, which insertion is expedited by the tapered point 18 at the end of body 16. The device is moved into the food article until cup 40 rests on the upper surface where it will remain irrespective of whether the food article is solid or liquid. The food article is then typically placed in the oven and, on attainment of the desired temperature, heat sensitive material 36 expands causing plunger 28 to extend from the body 16 to indicate that the food article is ready for serving. Extension of the plunger occurs gradually rather than explosively because of the air bubbles trapped at the bottom of the expansible volume. Not only does the air act as a cushion because it is compressible, but it attempts to rise in the heat sensitive material and thereby distributes the heat more uniformly throughout the heat sensitive material. Should a small quantity of the heat sensitive material 36 leak past seal 34 of piston 30, it will be captured within volume 46. Substantial leakage of heat sensitive material is avoided because shoulder 30 and sealing material 34 thereon bear against lip 26 to form a virtually leakproof seal.

Figure 6:
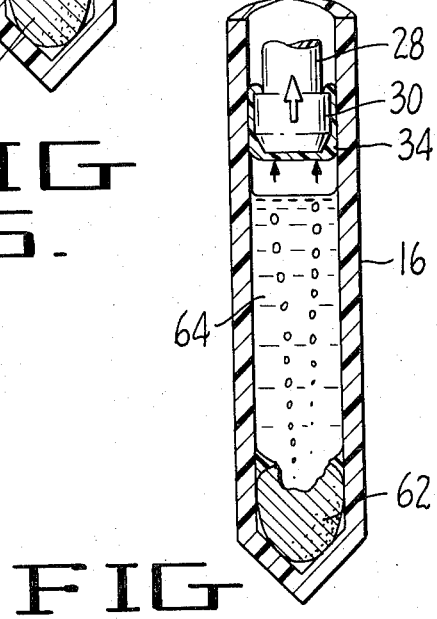
FIG. 6 is a fragmentary view of the device of FIG. 5 at attainment of the elevated temperature; and, FIG. 7 is a cross-sectional elevation view of still another embodiment of the present invention.

The embodiment of the invention shown in FIGS. 5 and 6 is in many respects similar to that disclosed in connection with FIGS. 1–4. Accordingly, identical reference numerals, where appropriate, are employed. Thus, the device of FIGS. 4 and 5 includes body 16 which defines a central bore 20 in which a plunger 28 is constrained for reciprocal movement. Plunger 28 includes a piston 30 having a fluid seal 34 thereon. Inward of piston 30 is defined an expansible volume 20' bounded in part by the piston. The heat sensitive expansible material is embodied by a first reactant material 62, e.g., a quantity of alkaline material such as baking soda, and an acid material 64, e.g., vinegar. The two reactant materials are separated from one another, at temperatures below the predetermined elevated temperature, by a membrane 66. Membrane 66 can be paraffin or mixtures of paraffin and other materials, so that the membrane melts at the temperature at which the device is set to respond. The membrane, therefore, separates the two reactant materials at temperatures below the desired predetermined elevated temperature, but melts or otherwise becomes pervious to the materials at the predetermined elevated temperature. Because a neutralization reaction produces gaseous products, a nucleation site is not essential in the embodiment of the invention shown in FIGS. 5 and 6.

Initial assembly of the device of FIGS. 4 and 5 can be achieved by first depositing within bore 20 a suitable quantity of alkaline material 62 which material is typically inert to paraffin or like materials so that membrane 66 can be formed by pouring in molten paraffin or the like. After the paraffin has cooled, a measured amount of acid 64 is deposited in volume 20' following which plunger 28 is inserted. Finally, seal plug 38 is put in place and the device is ready for use. Cup 40 facilitates the proper positioning of the device with respect to the surface of the food article. As cooking proceeds the predetermined temperature is ultimately reached, and membrane 66 fails. Upon failure of the membrane reactant 62 and 64 intermix thereby effecting volumetric expansion which moves plunger 28 outward in the direction of the arrow of FIG. 6. Should any of the reactant materials leak past piston seal 34, they will be captured in volume 46 of cup 40 and not contaminate the food article.

It will be obvious that many reactant materials 62 and 64 can be selected to achieve the desired reaction, the specific reactants referred to above having been found satisfactory, but being only exemplary. Moreover, the materials for membrane 66 can be selected from a wide range of materials so long as the material is impervious to the two reactants at low temperatures and fails at the desired predetermined elevated temperature.

Figure 7:
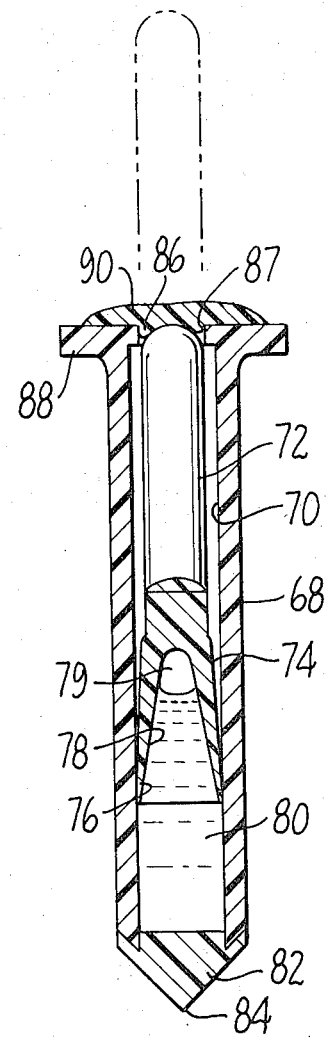

The modification of the present invention shown in FIG. 7 includes a body 68 which defines a central bore 70 of constant cross-sectional shape, typically circular. Disposed within bore 70 is a plunger 72 having at the lower or inner end thereof an enlarged outward flaring portion 74 that forms a piston seal within bore 70. The outward flared portion 74 has a converging wall 76 which is sufficiently thin at its distal extremity to introduce a degree of flexibility to achieve the requisite seal. The wall defines a volume 78 which converges upward and inward to define a space 79 of reduced cross-sectional size, which as will appear in more detail hereinbelow, assures entrapment of an air bubble during fabrication of the device. Below enlarged portion 74 and within volume 78 below air space 78 is disposed a heat sensitive expansible material 80. An end plug 82 fitted to the bottom of body 68 closes the bottom end of bore 70 and is tapered as at 84 to facilitate entry of the device into an article of food.

The opposite end of body 68 includes a mouth opening 86 defined by a lip 87 and having a diameter large enough to permit the upper end of plunger 72 to move therethrough but less than the diameter of enlarged seal portion 74. Thereby the plunger, although permitted to extend from body 68, cannot escape therefrom. A flange 88 circumscribes the upper end of body 68 and can be of the form shown in FIG. 7 or can be in the form of a cup denoted in FIG. 5 by reference numberal 40. Mouth 86 is closed, when plunger 72 is in the retracted position, by a seal 90 formed of material that melts or weakens at an elevated temperature to permit expulsion of plunger 72 from the body.

In fabricating the device of FIG. 7, the body 68, without end plug 82 in place, is inverted, and plunger 72 is inserted into bore 70 from the bottom, i.e., from the end normally occupied by plug 82. The plunger remains in the position shown in FIG. 7 because of the friction between enlarged portion 74 in the wall of bore 70. Seal material 90 can be applied at this stage or at a later stage. Heat sensitive material 80 is then poured into the volume defined between enlarged portion 74 in the walls of bore 70. The presence of converging wall 76, the presence of air space 78 and its relatively small cross-sectional area, and the surface tension of the flowable heat sensitive material cooperate to entrap an air bubble within the space 79. With the volume filled with material 80 plug 82 is installed at the end of body 68 and is sealed and fastened thereto by suitable techniques such as adhesives, ultrasonic welding, or the like. Thereupon, the structure is ready for introduction into a food article which is facilitated by the presence of tapered point 84. On attainment of the predetermined elevated temperature, determined by the constitution of heat sensitive material 80, expansion begins and is buffered or moderated by the presence of air space 79. Plunger 72 moves upward until enlarged portion 74 encounters lip 87 in mouth 86 whereupon a visual indication of readiness for serving of the food article is given the user of the device. The diverging outer surface of enlarged portion 74 and lip 87 cooperate to limit upward movement of plunger 72 and to avoid leakage of heat sensitive material 80.

The structural parts of the devices described hereinabove are typically made of nylon or like material which can be readily formed by injection molding procedures, which has sufficient high temperature strength to serve the purpose intended, and which has relatively low heat transmissivity characteristics. The length of the body is determined in large part by the cooking conditions employed because the temperature of the food article at a given distance beneath the surface of the food article is proportional to the time of cooking and to the heat transmissivity of the food article. By employing material with low heat transmissivity characteristics, heat energy to cause the heat sensitive material to expand flows through the food article rather than through the parts of the device so as to provide more uniform and accurate results. Elimination of a metallic spring circumscribing the plunger eliminates a heat transmission path and contributes to such uniformity and accuracy. The particular constitution of the heat responsive material is selected in accordance with the dimensions of the device, the quantity of heat sensitive material employed, and the specific nature of the food article with which the device is used.

Thus, it will be seen that the present invention provides a simple, low-cost temperature indicator which indicates attainment of a preselected elevated temperature by expelling a plunger which projects upward from the surface of the food article. This advantageous mode of operation is achieved without employment of a compression spring, and without employment of relatively expensive metals. Moreover, the structural parts of the device are designed virtually to eliminate leakage of heat resistant material from the interior of the device, and to prevent contamination of the food should such heat sensitive material inadvertently leak from the interior of the device.

Although three embodiments of the invention have been shown and described, it will be obvious that other adaptations and modifications can be made without departing from the true spirit and scope of the invention.

We claim:

1. A thermal indicator for providing an indication of a heated condition of an article of food when the article is heated to a predetermined temperature comprising a tubular body having an opened end and a closed end, said body being configured for facilitating insertion thereof into an article of food to be heated, said body defining an axial chamber of constant cross-section in communication with said opened end, a plunger disposed in said chamber and adapted for sliding travel therein between a retracted position within said body and an extended position axially spaced from the retracted position so that the plunger extends from said opened end, said plunger having at the inner end thereof a sealing member cooperatively associated with said axial chamber for defining within said body intermediate said sealing member and said closed end an enclosed expansible volume, and heat sensitive material experiencing substantial volumetric expansion at a temperature corresponding to said predetermined temperature so as to move the plunger to the extended position.

2. A thermal indicator according to claim 1 wherein said heat sensitive material includes first and second reactants disposed in said volume, a heat sensitive membrane inert to said reactants and disposed within said volume to isolate said reactants from one another, said heat sensitive membrane being adapted to fail at the predetermined temperature to afford interaction of said reactants.

3. A thermal indicator according to claim 2 wherein said first reactant is an acid and said second reactant is a base.

4. A thermal indicator according to claim 3 wherein said acid is vinegar and said base is baking soda.

5. A thermal indicator according to claim 1 wherein said plunger is approximately one-half the axial extent of said chamber so that the axial extent of said heat sensitive material is of the same order of magnitude as the distance of travel of said plunger between the retracted and extended positions and so that said heat sensitive material is remotely spaced from said opened end.

6. A thermal indicator according to claim 1 including means for positioning said body so that said opened end resides above the surface of the article of food in which the indicator resides, said positioning means including means defining a flange circumscribing and extending from the exterior of said body.

7. A thermal indicator according to claim 6 wherein said flange includes an upstanding wall at the outer periphery thereof to define an impervious cup around said opened end.

8. A thermal indicator according to claim 1 including a heat sensitive sealing plug for sealing said opened end, said plug being yieldable at or below said predetermined temperature to avoid inhibiting travel of said plunger to the extended position upon attainment of the predetermined temperature.

9. A thermal indicator according to claim 1 wherein said enclosed expansible volume is bounded in part by means defining a concavity, said concavity being formed by confronting wall portions, said wall portions being spaced from one another by an amount such that the surface tension of the heat resistive material supports the material in spanning relation with respect to the wall portions so as to entrap a quantity of air in said concavity.

10. A thermal indicator according to claim 9 wherein said concavity defining means is disposed at one axial extremity of said volume.

11. A thermal indicator according to claim 10 wherein said concavity defining means is disposed in said tubular body at said closed end.

12. A thermal indicator according to claim 10 wherein said concavity defining means is disposed in the sealing member of said plunger.

13. A thermal indicator according to claim 12 wherein said closed end of said body is formed by an opening and a plug sealable in said opening so that during assembly of the indicator said heat sensitive material can be introduced through said opening prior to installation of said plug.

* * * * *